United States Patent
Hall

(10) Patent No.: US 8,954,751 B2
(45) Date of Patent: Feb. 10, 2015

(54) SECURE MEMORY CONTROL PARAMETERS IN TABLE LOOK ASIDE BUFFER DATA FIELDS AND SUPPORT MEMORY ARRAY

(75) Inventor: William E. Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 3281 days.

(21) Appl. No.: 10/981,064

(22) Filed: Nov. 4, 2004

(65) Prior Publication Data

US 2006/0095793 A1    May 4, 2006

(51) Int. Cl.
- *G06F 21/00* (2013.01)
- *G06F 12/14* (2006.01)
- *G06F 21/12* (2013.01)

(52) U.S. Cl.
CPC ............ *G06F 12/145* (2013.01); *G06F 21/121* (2013.01)
USPC ............................... 713/190; 726/14; 711/164

(58) Field of Classification Search
CPC .................................................. G06F 21/121
USPC .......... 711/163, 164; 713/189, 190; 726/1–36
See application file for complete search history.

(56) References Cited

U.S. PATENT DOCUMENTS

| | | | |
|---|---|---|---|
| 5,239,635 A * | 8/1993 | Stewart et al. ................. | 711/206 |
| 5,628,023 A * | 5/1997 | Bryant et al. .................. | 711/207 |
| 6,035,381 A * | 3/2000 | Mita et al. ...................... | 711/164 |
| 6,226,743 B1 | 5/2001 | Naor et al. | |
| 6,332,184 B1 | 12/2001 | Campbell | |
| 6,351,797 B1 | 2/2002 | Beard, Sr. et al. | |
| 6,460,114 B1 | 10/2002 | Jeddeloh | |
| 6,889,329 B1 | 5/2005 | DiGiorgio et al. | |
| 6,941,292 B2 | 9/2005 | Gaur et al. | |
| 6,959,384 B1 | 10/2005 | Serret-Avila | |
| 7,065,215 B2 | 6/2006 | Shirakawa et al. | |
| 7,073,030 B2 | 7/2006 | Azevedo et al. | |
| 7,136,488 B2 | 11/2006 | Hashimoto et al. | |
| 7,194,092 B1 * | 3/2007 | England et al. ................ | 380/262 |
| 7,383,587 B2 * | 6/2008 | Watt et al. ........................ | 726/30 |
| 7,496,748 B2 * | 2/2009 | Mercer et al. .................. | 713/150 |
| 2002/0124148 A1 * | 9/2002 | Beukema et al. ............. | 711/163 |
| 2003/0005279 A1 * | 1/2003 | Valenci et al. ................. | 713/150 |
| 2003/0018908 A1 * | 1/2003 | Mercer et al. .................. | 713/193 |
| 2003/0065933 A1 | 4/2003 | Hashimoto et al. | |
| 2003/0200454 A1 * | 10/2003 | Foster et al. ................... | 713/200 |
| 2004/0107341 A1 | 6/2004 | Hall et al. | |

(Continued)

OTHER PUBLICATIONS

Teller, P.J.; et al.; "TLB consistency on highly-parallel shared-memory multiprocessors"; System Sciences, 1988. vol. 1. Architecture Track, Proceedings of the Twenty-First Annual Hawaii International Conference on vol. 1; DOI: 10.1109/HICSS.1988.11765 Publication Year: 1988 , pp. 184-193.*

(Continued)

*Primary Examiner* — Hadi Armouche
*Assistant Examiner* — Angela Holmes
(74) *Attorney, Agent, or Firm* — Patterson & Sheridan, LLP

(57) ABSTRACT

Techniques and apparatus for utilizing bits in a translation look aside buffer (TLB) table to identify and access security parameters to be used in securely accessing data are provided. Any type of bits in the TLB may be used, such as excess bits in a translated address, excess attribute bits, or special purpose bits added specifically for security purposes. In some cases, the security parameters may include an index into a key table for use in retrieving a set of one or more keys to use for encryption and/or decryption.

22 Claims, 8 Drawing Sheets

(56) References Cited

U.S. PATENT DOCUMENTS

| | | | |
|---|---|---|---|
| 2004/0143734 A1* | 7/2004 | Buer et al. | 713/153 |
| 2004/0177257 A1 | 9/2004 | Fujinawa et al. | |
| 2004/0255145 A1* | 12/2004 | Chow | 713/200 |
| 2005/0198492 A1* | 9/2005 | Gaur et al. | 713/153 |
| 2005/0198498 A1* | 9/2005 | Gaur et al. | 713/160 |
| 2006/0015754 A1* | 1/2006 | Drehmel et al. | 713/193 |

OTHER PUBLICATIONS

Lee, Jung-Hoon;et al.; "A selective filter-bank TLB system [embedded processor MMU for low power] ";Low Power Electronics and Design, 2003. ISLPED '03. Proceedings of the 2003 International Symposium on DOI: 10.1109/LPE.2003.1231885 Publication Year: 2003 , pp. 312-317.*

IBM U.S. Appl. No. 10/961,743, entitled, "Secure Memory Caching Structures for Data, Integrity and Version Values", filed Oct. 8, 2004.

Article by C. Jutla entitled "Encryption Modes With Almost Free Message Integrity", Proc. Eurocrypt 2001, pp. 529-544, LNCS 2045.

Article entitled, "The CoreConnect™ Bus Architecture", pp. 1-8.

Charanjit S. Jutla: "Encryption Modes with Almost Free Message Integrity", Advances in Cryptology—Eurocrypt 2001, International Conference on the Theory and Application of Cryptographic Techniques, Innsbruck, Austria, May 2001, Proceedings, pp. 529-544.

* cited by examiner

SECURE MEMORY CONTROL PARAMETERS IN TABLE LOOK ASIDE BUFFER DATA FIELDS AND SUPPORT MEMORY ARRAY

CROSS-REFERENCE TO RELATED APPLICATIONS

This application contains subject matter which is related to the subject matter of the commonly owned, U.S. Application entitled "SECURE MEMORY CACHING STRUCTURES FOR DATA, INTEGRITY AND VERSION VALUES," application Ser. No. 10/961,743, filed on Oct. 8, 2004, hereby incorporated herein by reference in its entirety.

BACKGROUND OF THE INVENTION

1. Field of the Invention

The present invention generally relates to data encryption and, more particularly, to methods and apparatus for identifying and storing parameters to be used when securely accessing data through the use of encryption.

2. Description of the Related Art

A system on a chip (SOC) generally includes one or more integrated processor cores, some type of embedded memory, such as a cache shared between the processors cores, and peripheral interfaces, such as memory control components and external bus interfaces, on a single chip to form a complete (or nearly complete) system. The use of cache memory hierarchies is well established to improve a processor performance by reducing and/or eliminating read access requests to external memory.

As part of an enhanced security feature, some SOCs encrypt some portions of data prior to storing it in external memory. Adding such encryption to an SOC may add valuable benefits, such as preventing a hacker from obtaining instructions of a copyrighted program, such as a video game, or data that may be used to determine such instructions through reverse engineering. When the encrypted data is subsequently retrieved from external memory, it must first be decrypted before it can be used by the processor cores.

A set of security parameters (stored on or off chip) may contain information about the type of security to be applied to different portions of memory. For example, these security parameters may identify which portions of memory are protected as well as, for those identified portions of memory that are protected, exactly how encryption is applied (e.g., an encryption block size, a set of encryption keys, and the like). Unfortunately, according to some implementations, some amount of latency may be suffered as a set of security parameters is located and retrieved, for example, based on the address of data targeted in a memory access request.

In virtual memory systems, real (or "physical") addresses of the targeted data are often translated from virtual addresses utilizing a data table commonly referred to as a translation look aside buffer (TLB). In some cases, possibly due to scalability reasons, the number of external address lines (actually leaving the SOC) may be less than the total number of bits of the translated real address. As a result, the translated real address may have a number of "excess" bits that are not utilized. Further, TLB entries often have some collection of attribute bits that contain information about corresponding data (e.g., valid and dirty bits). The collection of attribute bits may also include unutilized excess bits.

In conventional SOCs, such excess address and/or attribute bits in TLB entries constitute a waste of resources. It would be desirable to utilize these excess bits in a TLB entry, for example, to identify a set of security parameters to be applied to corresponding data.

SUMMARY OF THE INVENTION

Embodiments of the present invention generally provide techniques and apparatus for utilizing conventionally unused bits in a translation look aside buffer (TLB) table to identify and access parameters to be used in securely accessing data.

One embodiment generally provides a method of securely accessing data. The method generally includes receiving a memory access request, retrieving a translated real address, from an entry in a translation look aside buffer (TLB), for data targeted by the request, retrieving, from a security parameters table, security parameters using an index contained in the TLB entry, wherein the security parameters contain information regarding how the targeted data should be encrypted, decrypted, or both, and accessing the targeted data using the retrieved translated real address and security parameters.

Another embodiment generally provides a security-enabled system on a chip (SOC) for processing secure data stored, in an encrypted form, in external memory. The SOC generally includes one or more processing cores, a security parameters table having entries, each containing a set of one or more security parameters for use in securely accessing a corresponding block of data, a translation look aside buffer (TLB) having entries, each containing a translated real address for a corresponding virtual address contained in a memory access request, and a security mechanism. The security mechanism is generally configured to securely access data targeted by memory access requests using security parameters from an entry in the security parameters table retrieved using an index obtained from an entry in the TLB.

Another embodiment provides a system generally including external memory and a security-enabled system on a chip (SOC) for processing secure data stored, in an encrypted form, in the external memory. The SOC generally includes a security parameters table having entries, each containing a set of one or more security parameters for use in securely accessing a corresponding block of data, a TLB having entries, each containing a translated real address for a corresponding virtual address contained in a memory access request, and a security mechanism. The security mechanism is generally configured to securely access data targeted by memory access requests using security parameters from an entry in the security parameters table retrieved using an index obtained from an entry in the TLB.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide techniques and apparatus for utilizing bits in a translation look aside buffer (TLB) table to identify and access security parameters to be used in securely accessing data. Any type of bits may be used, such as excess bits in a translated address or excess bits in a configuration or attribute field. In the event that excess bits are not available, security bits may be added to TLB entries to still allow efficient use of the TLB structure in identifying and accessing security parameters. In any case, by storing security information in the TLB, the complexity of security mechanisms may be reduced as an additional translation component may be removed therefrom.

The security parameters may include any type of data used during any part of the encryption process. For example, the security parameters may include an identification of a set of encryption/decryption keys, encryption block sizes, and the like. As used herein, the term secure data refers to data that is to be encrypted when stored external to an encryption-enabled device, such as an SOC, while the term non-secure data refers to data that may be stored externally in non-encrypted form. Data that is non-encrypted (whether secure or non-secure) is referred to herein as plaintext while data that is encrypted is referred to herein as ciphertext. These terms are used for convenience and do not imply the encrypted or non-encrypted data is actually textual data.

As used herein, the term translation look aside buffer (TLB) generally refers to any type of data structure used to store (e.g., cache) a set of translated real or physical addresses that have been generated based on the virtual addresses of previously-accessed memory locations, typically contained in page table entries. By creating TLB entries for memory locations when they are first accessed, the translated real addresses for these locations may be quickly retrieved from the TLB without the latency associated with generating the translated real address. Similarly, by storing, in entries loaded into the TLB when memory locations are first accessed, an index into a security parameters table, security parameters containing information about the type of security to be applied to the corresponding data may be quickly retrieved, from a security parameters table, without the latency associated with identifying and locating the security parameters each time the data is accessed. Further, by storing indexes into the security parameters table in the TLB, different types of security parameters may be readily applied to different zones of memory, facilitating the mapping of address space into different secure zones.

An Exemplary System

Figure 1:
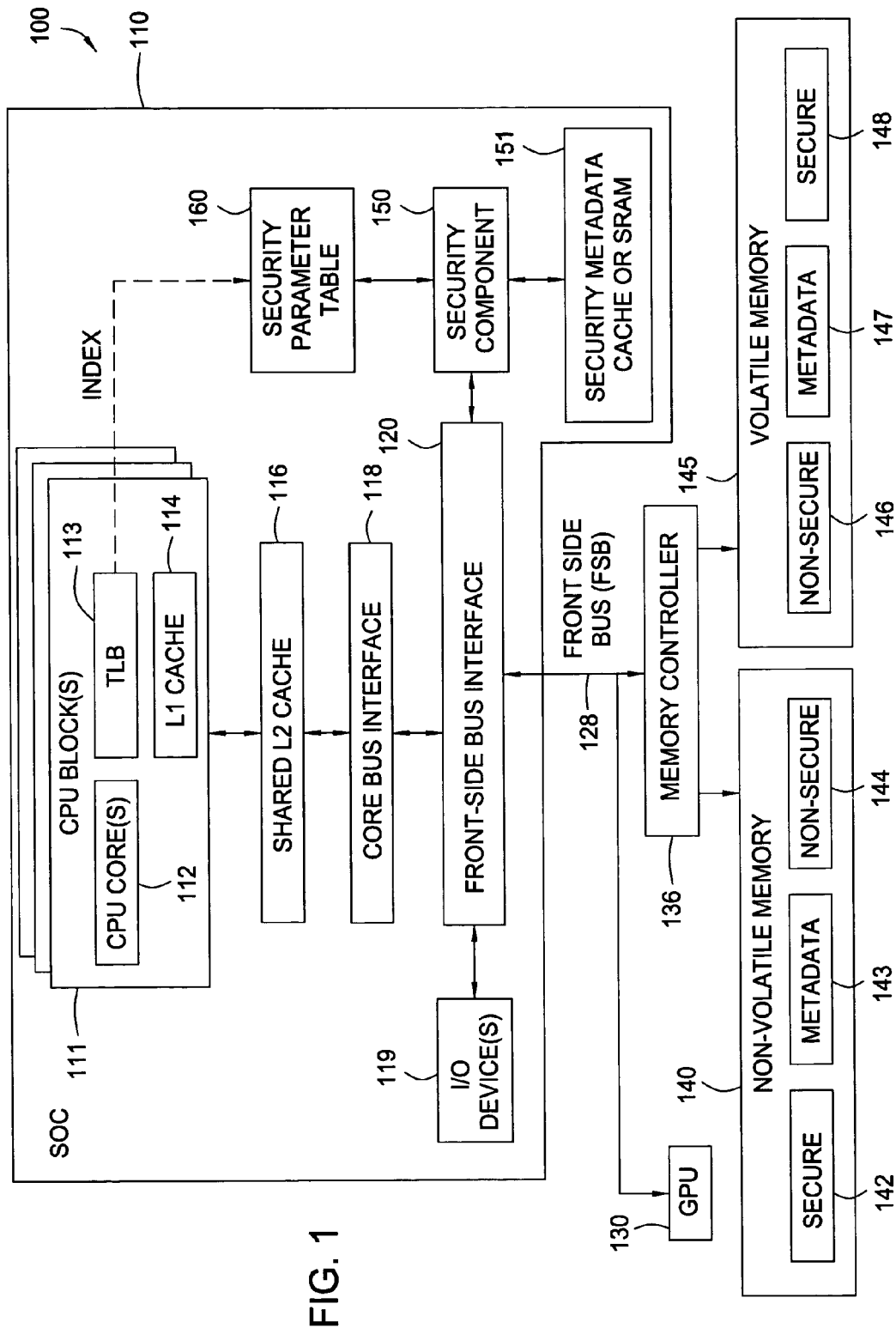
FIG. 1 illustrates an exemplary system including an exemplary system on chip (SOC), in which embodiments of the present invention may be utilized.

Referring now to FIG. 1, an exemplary computer system 100 including a system on chip (SOC) 110 is illustrated, in which embodiments of the present invention may be utilized. As illustrated, the SOC 110 may have one or more processor blocks 111, each with one or more processor cores 112, which may each include any number of different type functional units including, but not limited to arithmetic logic units (ALUs), floating point units (FPUs), and single instruction multiple data (SIMD) units. Examples of SOCs utilizing multiple processor cores include SOCs incorporating the PowerPC® line of CPUs, available from International Business Machines (IBM) of Armonk, N.Y.

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external memory (e.g., non-volatile memory 140 and volatile memory 145). Similarly, data utilized often by a processor core 112 may be stored in its L1 cache 114, preventing or reducing the number of relatively slower accesses to the L2 cache 116.

As previously described, a processor block 111 may include a translation look aside buffer (TLB) 113 to convert virtual addresses to real addresses. The translated real addresses are also used to identify entries in the L1 caches. As will be described in greater detail below, the TLB 113 may be capable of producing translated addresses with a bit-length capable of accessing an address space much larger than the actual physical memory address space. For example, the TLB 113 may be capable of producing 42-bit translated real addresses while only 32 may be needed to address 4 GB of real memory supported by the system 100. As will be described in greater detail below, for some embodiments, these excess bits (or other bits added to the TLB) may hold an index used to retrieve a set of security parameters from a security parameters table 160.

The SOC 110 may communicate with external devices, such as a graphics processing unit (GPU) 130 and a memory controller 136 via a system or frontside bus (FSB) 128. The SOC 110 may include an FSB interface 120 to pass data between the external devices and the processing cores 112 (through the L2 cache) via the FSB 128. The FSB interface 120 may include any suitable components, such as a physical layer (not shown) for implementing the hardware protocol necessary for receiving and sending data over the FSB 128. Such a physical layer may exchange data with an intermediate "link" layer which may format data received from or to be sent to a transaction layer. The transaction layer may exchange data with the processor cores 112 via a core bus interface (CBI) 118.

An FSB interface on the GPU 130 and memory controller 136 may have similar components as the FSB interface 120, configured to exchange data with SOC 110 via the FSB 128. While shown as a separate device in FIG. 1, for some embodiments, the memory controller 136 may be integrated with the GPU 130 or with the SOC 110. For some embodiments, in addition to the processing cores 112, one or more other I/O devices 119 integrated with the SOC 110, such as a direct memory access (DMA) component, may also access memory via the FSB 128. For some embodiments, such devices may also have some type of translation (TLB-like) structures for supplying indexes for use in security parameter table lookup operations, as described herein with reference to the CPU block 111. Accordingly, while the following description will be described with reference to access for data by the processor cores 112, the security techniques described herein may also be applied to provide secure access to data processed by any such I/O devices 119 with similar TLB-like structures. As an alternative, if such devices have extended fields, an index may be placed in its descriptors.

As illustrated, the memory controller 136 may provide access to various types of external memory devices, such as non-volatile memory 140 and volatile memory 145 (collectively, external memory). Devices in the system 100 (e.g., SOC 110 and GPU 130) may have shared access to external memory in order to minimize memory costs, and to facilitate the transfer of data between functions performed thereby. Typically, non-volatile memory is used for persistent storage, wherein data should-be retained even when power is removed. This memory may contain boot code, operating code, such as the operating system and drivers, and any persistent data structures. Volatile memory, on the other hand is used for session oriented storage, and generally contains application data as well as any corresponding data structures. Since volatile memory is faster than non-volatile memory, it is common to move operating code to volatile memory and execute instructions from there when the integrated device is operational.

Secure Data Processing

As part of an enhanced security feature, the SOC 110 may encrypt some portions of data, referred to herein as secure data, prior to storing it in external memory (such encrypted portions of data are illustratively shown as secure data 142 and 148 in memories 140 and 145, respectively). Accordingly, the SOC 110 may include a security component 150 used to encrypt secure data prior to transmission over the FSB 128 by the FSB interface 120. Upon later retrieval of the encrypted data, the security component 150 may also be used to decrypt the encrypted secure data prior to passing it into the L2 cache 116 for use by one or more of the processor cores 112.

For some embodiments, portions of memory may be divided or partitioned into zones of secure data (142 and 148) and non-secure data (144 and 146) that may be stored externally without encryption. Further partitioning may also be employed, for example, dividing secure data (142 and 148) into separate zones that require encryption and validation, encryption only, and/or read-only zones. For some embodiments, the identification of such zones may be included in a set of parameters contained in the security parameters table 160.

The security component 150 may employ any suitable encryption algorithms or combination of algorithms for encryption/decryption, including, but not limited to algorithms utilizing whitening keys, hash keys, and/or Advanced Encryption Standard (AES) keys. For some embodiments, one or more of these keys may be generated based on a master key stored in some type of persistent storage (e.g., laser or electrically programmable fuses) located on the SOC 110. For other embodiments, the master key may be used to protect these keys, for example, by encrypting a data structure containing the keys or used to generate the keys. As will be described in greater detail below, encryption may also utilize a security version parameter. The security parameters table 160 may include parameters indicating the type of algorithms used for encryption/decryption, a set or sets of keys to use, and the like.

In some cases, information regarding the key(s), as well as the version used for encryption, and/or validation of encrypted data, may be encrypted and stored externally, as a secure block of data, shown as security metadata 143 and 147. As will be described in greater detail below, upon retrieval of secure data, this metadata may be retrieved for validation and/or decryption purposes. For some embodiments, a base address of the security metadata (integrity and/or version values) for a targeted block of data may be contained as a field in the security parameters table 160.

For some embodiments, in an effort to improve the efficiency and performance of secure data processing, some portions of the metadata and/or secure data may be cached internal to the SOC 110 in a metadata cache 151 (accessible to or integrated with the security component 150). Caching metadata and/or secure data may improve performance by allowing access to data/metadata that has already been decrypted, thereby reducing decryption latency associated with subsequent accesses to the same data/metadata, or data/metadata that is nearby in address space (due to locality of reference). Concepts and data structures used to cache security metadata are described in detail in the commonly assigned, co-pending application entitled "SECURE MEMORY CACHING STRUCTURES FOR DATA, INTEGRITY AND VERSION VALUES," Ser. No. 10/961,743, filed on Oct. 8, 2004.

Figure 2A:
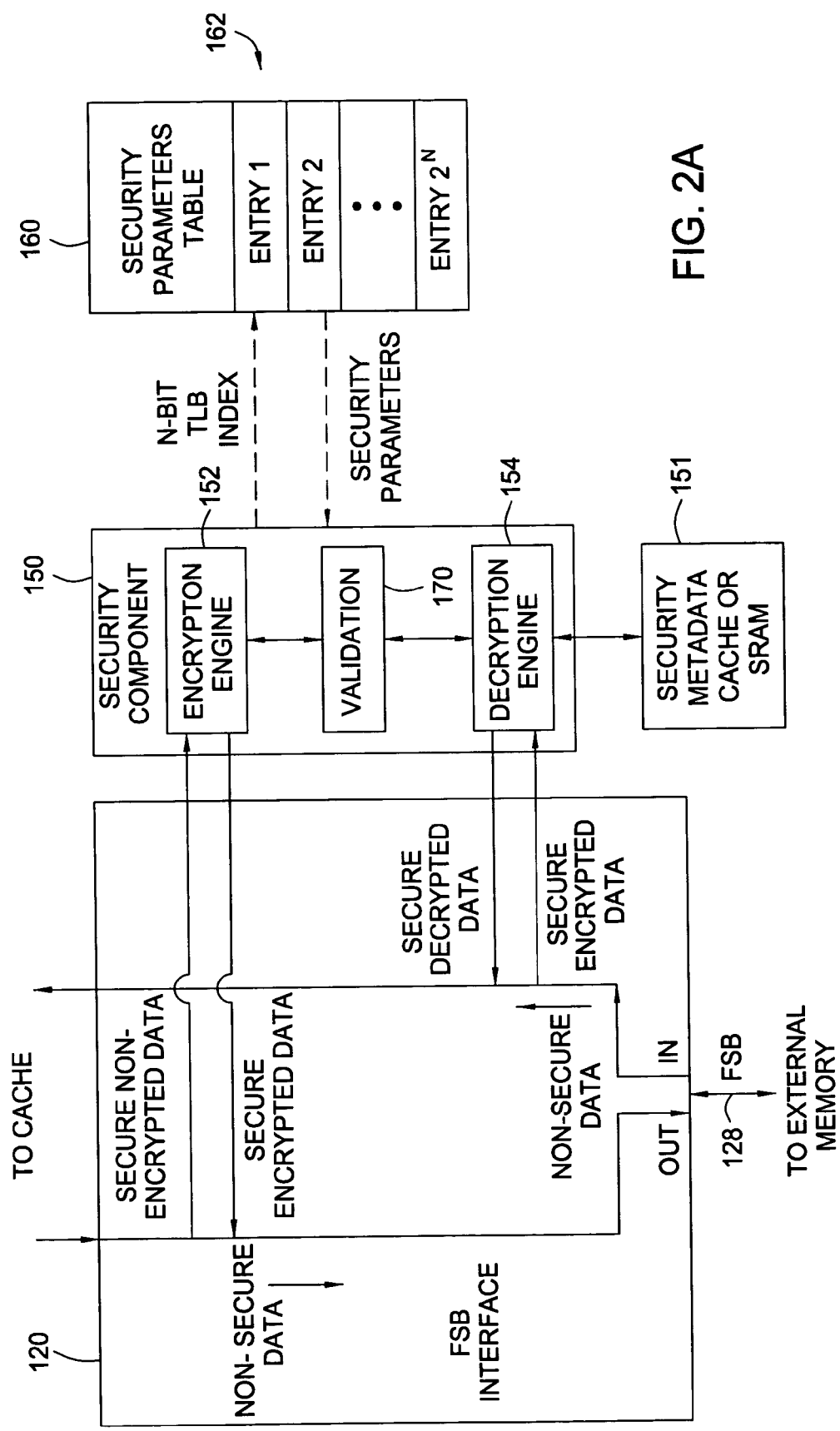
FIGS. 2A-2B are block diagrams illustrating secure data flow through the SOC, according to one embodiment of the present invention.

FIG. 2A is a block diagram that illustrates the flow of both secure and non-secure data through the CPU, in accordance with one embodiment of the present invention, for example, as data is read into the cache from external memory and written out from the cache to external memory. Such data flow may take place, for example, when loading instructions and/or data of a program, such as a game program (e.g., from disk), into the SOC 110 for execution. While not shown, flow control logic configured to identify and route secure and non-secure data in accordance with FIG. 2A may be included in the FSB interface 120. As illustrated, data retrieved from external memory that is not secure, as indicated by an indexed entry in the security parameters table 160 (obtained using an index from the TLB), is forwarded on to the cache bypassing the decryption engine 154, as no decryption is required.

Note that data received from the processor cache will typically be unencrypted (plaintext) regardless of whether the data is secure or non-secure. If the data is not secure, the plaintext data is written directly out to external memory. If the data is secure, the plaintext data is routed to an encryption engine 152 of the security component 150 for encryption. The encryption engine 152 encrypts the secure data and returns the secure data encrypted (as ciphertext). Information in an entry in the security parameters table retrieved using an index from the TLB or, in some instances the index itself, may be examined to determine if the data is secure or non-secure. In general, there need not be a one to one mapping of TLB entries to security parameter table entries. Rather, each entry in the security parameters 160 may cover a range of addresses, or multiple ranges of addresses (which may be discontiguous), of secure or non-secure data. By creating TLB entries for different addresses or "zones" having the same index into the security parameters table, the same type of security parameters may be applied to different ranges of memory. As a result, such secure and non-secure zones need not be rigidly determined up front, but may be allocated as necessary, for example, as new applications (programs/games) are loaded.

For some portions of secure data, an integrity check value (ICV) may be calculated (using any suitable checksum or hash algorithm) based on the secure data in plaintext and/or ciphertext form, to allow for subsequent authentication to ensure the encrypted data was not modified (tampered with). This ICV may be stored internally (e.g., in static RAM on chip) or encrypted and stored externally. In any case, the location of the ICV may be identified as a field in a corresponding entry 162 in the security parameters table 160.

Figure 2B:
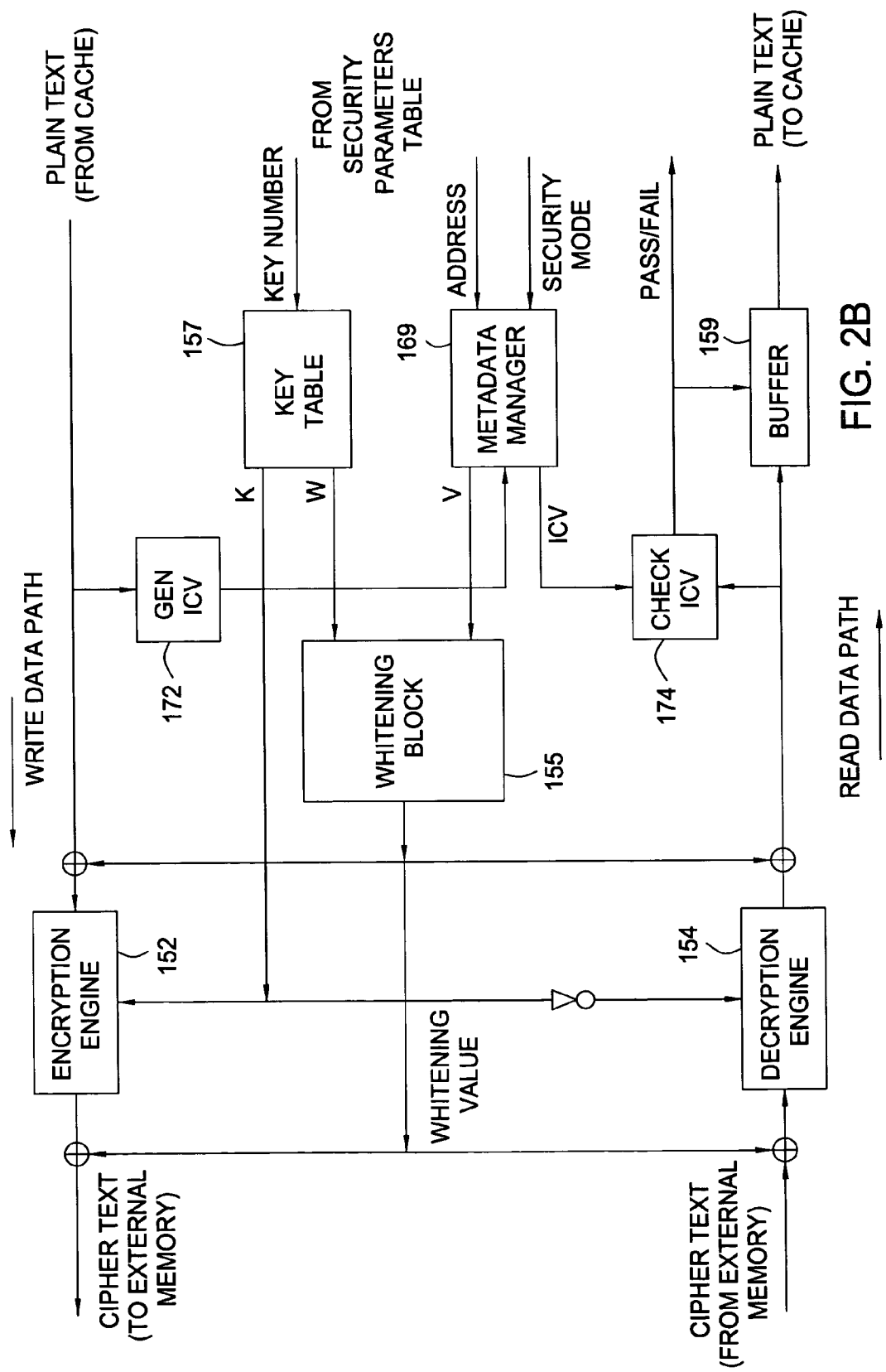

As illustrated, for each block of data being securely accessed, the security component 150 may retrieve a corresponding entry 162 containing a set of security parameters from the security parameters table 160 using an index from the TLB 113. As previously described, the index may be stored in bits of the TLB 113, such as excess attribute bits, excess address bits, or bits added specifically for security purposes. FIG. 2B illustrates how various security parameters contained in the entry 162 may be used for decryption and encryption.

As illustrated in FIG. 2B, the encryption engine 152 may encrypt the plaintext data using one of more keys (K). For some embodiments, the one or more keys, or a selection thereof may be contained in the entry 162 retrieved from the security parameters table 160 (e.g., by a metadata manager 169). For other embodiments, the entry 162 may include an index (key number) used to retrieve the one or more keys from a key table 157. The encrypted data may also be affected by a whitening value, which may be calculated by a whitening block 155, as a function of a whitening variable provided by the key table 157 (or contained in the entry 162) and a security version value V. In general, whitening refers to a method of adding a variable to data to be encrypted as a means of removing pattern dependencies and is described in, for example, an article by C. Jutla entitled "Encryption Modes With Almost Free Message Integrity" Proc. Eurocrypt 2001, pp. 529-544, LNCS 2045.

It should be noted that, in general, a change in the security version value results in a different encryption result (e.g., different ciphertext given the same plaintext), thus providing a convenient mechanism to vary the encryption. For some embodiments, every time secure data is written to external memory, a new security version value may be used to affect the encryption, thus making it more difficult for a hacker to determine security information by monitoring data traffic. Utilizing new security version values also renders "recordings" of previous encrypted data at that location unusable, preventing so-called "replay attacks."

As illustrated, the decryption engine 154 may also use the one or more keys K and whitening value to decrypt ciphertext data retrieved from external memory. For some embodiments (and for some portion of memory), an integrity check value (ICV) may be calculated based on the secure data in plaintext and/or ciphertext form, by an ICV generation component 172, to allow for subsequent authentication to ensure the encrypted data was not modified (tampered with). An ICV may be calculated on retrieved data, and compared against a stored ICV, by an ICV check component 174, to detect tampering. If the calculated and stored ICVs match, the ICV check component 174 may generate a PASS signal and pass the data on (from a buffer 159) to the CPU cache. If the calculated and stored ICVs do not match, the ICV check component 174 may generate a FAIL signal, triggering a security exception.

While some embodiments may use encryption/decryption engines implemented in hardware, for some embodiments some or all of the encryption and/or validation operations described herein and shown in the Figures may be performed in software (e.g., running in a secure environment), utilizing security parameters retrieved using an index from the TLB 113. Accordingly, the concepts described herein related to secure data processing using a metadata cache may be used to advantage in systems utilizing hardware encryption, software encryption, or any combination thereof.

Retrieving Security Parameters Using the TLB

Figure 3A:
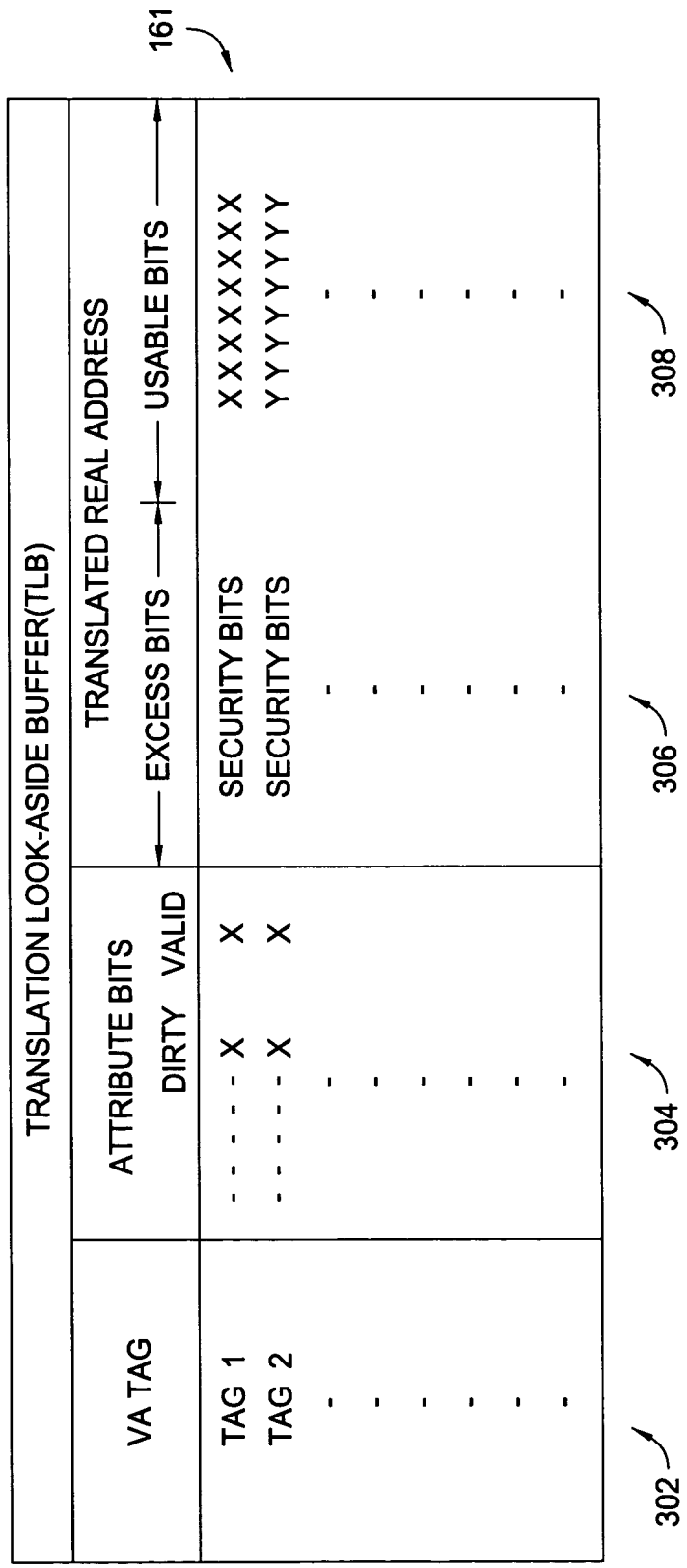
FIGS. 3A-3B illustrate an exemplary translation look aside buffer (TLB) table and an exemplary diagram of a translated real address containing security parameter bit fields, according to one embodiment of the present invention.

As previously described, for some embodiments, an index stored in the TLB 113 may be used to retrieve, from the security parameters table 160, security parameters used during the encryption process, such as security modes, encryption block sizes, key sets, integrity check values (ICVs), and the like. In some cases, security parameters may be stored directly in a TLB. For example, as illustrated in FIG. 3A, a limited amount of security parameters may be stored in bits 306 of a translated address field 308. As an alternative, or in addition, some amount of security information may also be stored in bits of a set of attribute bits 304.

Figure 3B:
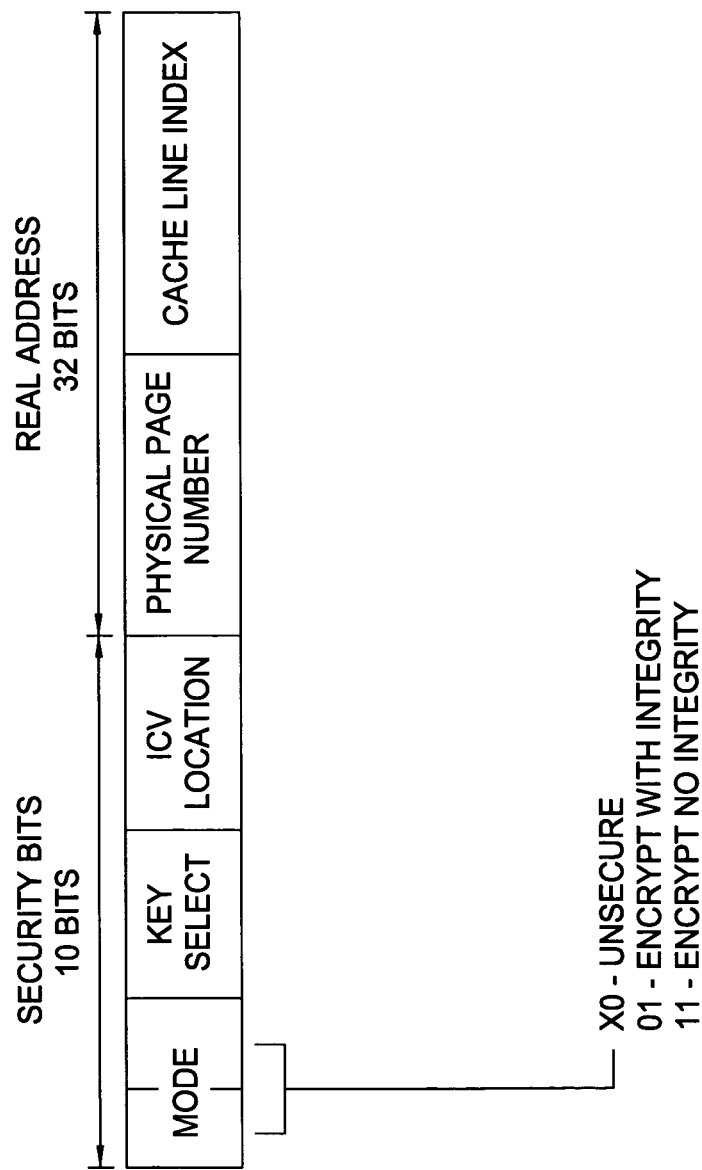

In either case, this security information may be readily accessed when a memory location having a corresponding TLB entry 161 (as indicated by a match with a virtual address tag field 302) is accessed. FIG. 3B illustrates the type of security information that may be contained directly in excess address bits. As illustrated, a multi-bit mode field may indicate what mode of encryption is to be applied to an accessed block of data. Illustratively, three modes of encryption are shown: unsecure (no encryption), encryption with integrity (ICV values), or encryption without integrity. A key select field may include one or more bits used to select a set of key (and/or whitening) values. An ICV location field may indicate a location (internally or externally) of an integrity check value calculated (or to be calculated) for the data.

Figure 4:
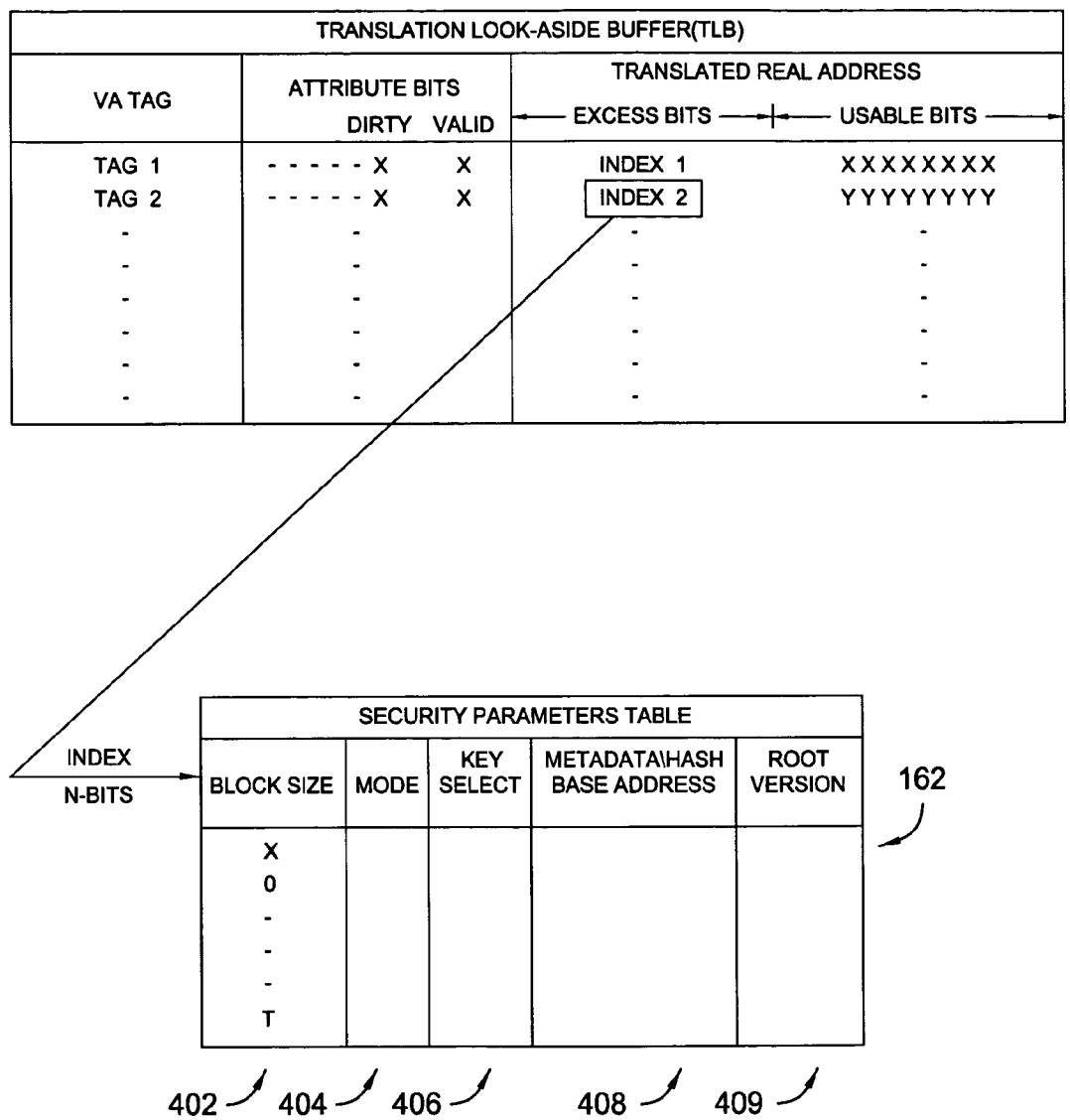
FIG. 4 illustrates an exemplary TLB table and security parameters table, according to one embodiment of the present invention.

While storing security parameters directly in the TLB may be useful, there is a practical limit on the amount of security information that can be stored in this manner due to the limited number of available bits. For some embodiments, rather than store security parameters directly in the TLB, TLB bits may be used to store an index into the security parameters table 160, as illustrated in FIG. 4. Each entry 162 in the security parameters table 160 may contain a relatively large number of bits (e.g., several times more bits than the index itself), allowing a much greater amount of security information to be rapidly accessed using the index.

For some embodiments, one or more high fixed index values may be used to indicate one or more security settings where a security parameters table 160 does not contain the full number of entries the index can support. For example, utilizing a 6 bit index (which could be used to access one of 64 total entries in the security parameters table), index values 62 and 63 may indicate particular security settings (e.g., pass through with no caching and non-secure plain text with no encryption/decryption) not requiring table access. This approach allows a full $2^M$ entries (e.g., 16 if M=4) in a security parameters table 160 to be accessed. For other embodiments, an N-bit index may be used to access one of $2^N-1$ entries 162, with a zero index in the TLB indicating no security is enabled for the corresponding memory location (e.g., the previously described unsecure mode). For still other embodiments, table lookup may always be required and a zero value in the mode field 404 of an entry 162 may indicate an unsecure mode (although this approach may not make the most efficient use of the security parameters table, as an entire entry is used to indicate no security). In any case, due to a possible increase in the number of bits available in an entry 162 (relative to the number of bits used for the index), a greater number of modes may be supported than if the security mode information was contained in the TLB bits.

More specific modes, such as encrypt for read only, encrypt for write only, pass through-no encryption, non-secure plaintext, encrypt once (no ICV utilizing a fixed version), encrypt any (no ICV, varying version), secure once (ICV created once, non-varying version), and secure any (new ICV and version value with every write operation) and the like, may be supported with different modes (different indexes), which may be useful in a wide variety of applications. As an example, limitations on writing to flash memory may require writing to take place at much smaller increments than reads. Therefore, in order to encrypt a large amount of data to be written in flash memory, the data may be first written (encrypted) to main memory (e.g., DRAM) in order to take advantage of efficient encryption, and then read back (with no decryption) and written to flash incrementally (with no encryption).

As illustrated, the security parameters table 160 may include a variety of other fields, for example, including, but not limited to, a block size field 402, a key select field 406, a metadata base address field 408, and root version field 409 holding a fixed or root varying version value, depending on the security mode. The metadata base address field 408 may be used in conjunction with the real address to retrieve a set of security metadata, which may be stored internally or externally. If ICVs are stored internally in SRAM, the metadata base address field 408 may indicate an offset location in the SRAM containing a corresponding ICV. Due to the increased size of the entry 162 relative to the index, the base address field 408 may be able to hold a relatively large (e.g., 32 bit) real address of externally stored security metadata.

Figure 5:
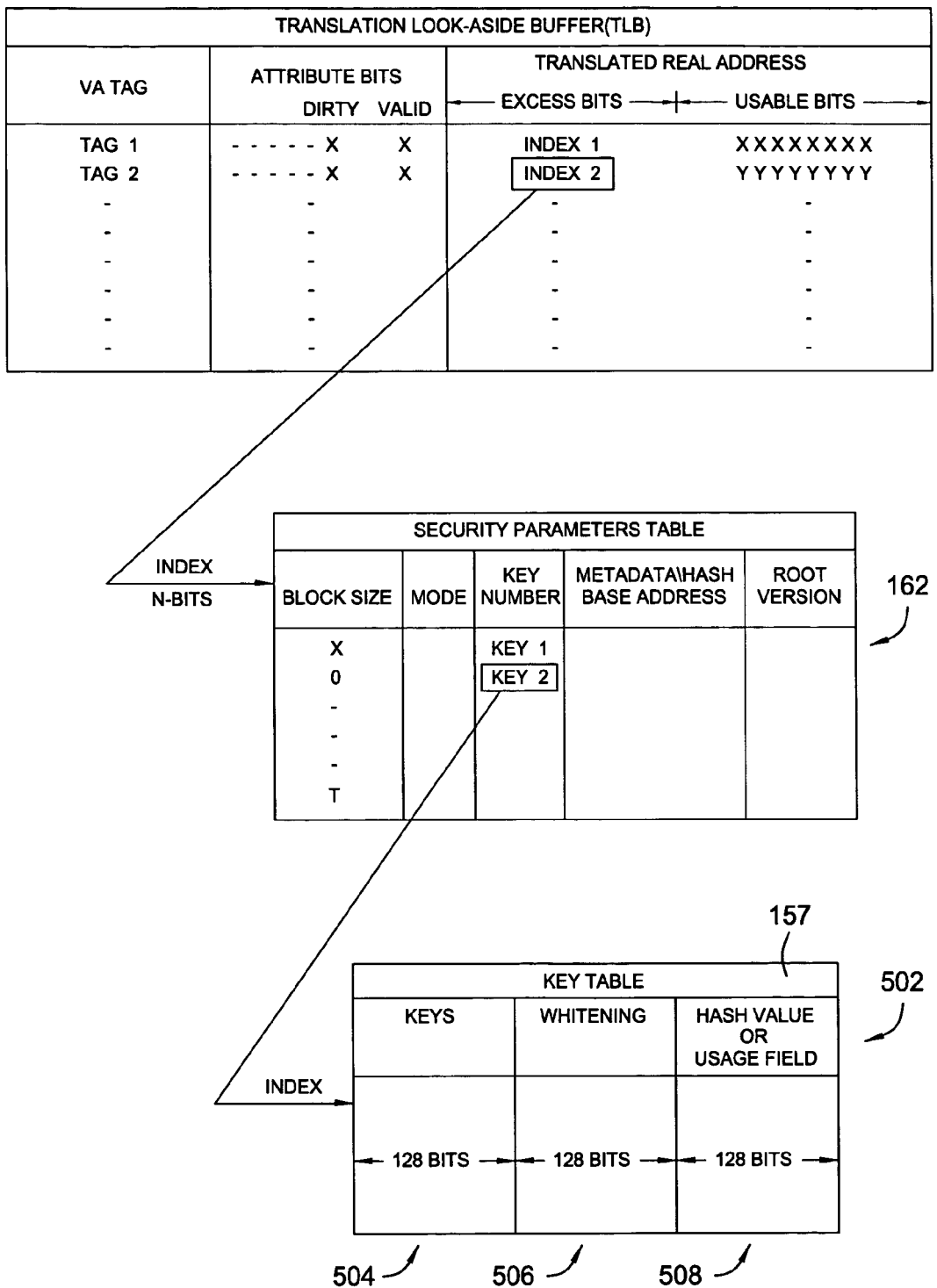
FIG. 5 illustrates and exemplary TLB table, security parameters table, and key table, according to one embodiment of the present invention.

The key select field 406 may contain an indication of a key set to use for encryption/decryption. In some cases, an entry may actually contain an entire set of one or more keys. As an alternative, as illustrated in FIG. 5, for some embodiments, a key number field 407 may include a key number or index used to retrieve a set of keys from a key table 157. The key table 157 may include key set entries 502, each containing a key value field 504, whitening value field 506, and hash value/usage field 508, which may each be relatively large (e.g., 128-bits). Accordingly, storing the keys in a separate key table 157 may allow the security parameters table 160 to remain a manageable size and may also facilitate key management (e.g., the key table 157 may be updated without modifying the security parameters table 160). Use of a separate key table 157 may also facilitate the sharing of key sets among different secure zones of memory locations (with similar security characteristics). The field 508 may be used, for example, to store a hash value if ICVs are stored in on-chip SRAM (e.g., not necessary keeping track of a number of encryptions) or, alternatively, to store a usage counter if a security metadata cache 161 is used.

Any other suitable security parameters may also be stored in the security parameters table 160, such as usage counters used to monitor the number of times a block of data has been encrypted, for example, to avoid repeating the same whitening values and avoid overusing keys. In other words, a usage counter may be a monotonically increasing counter used to affect encryption. Each time the usage counter is used to encrypt a block of data (e.g., by generating a version value based on the usage counter), it may be incremented such that the next time it is used for encryption, will get a new version value.

Figure 6:
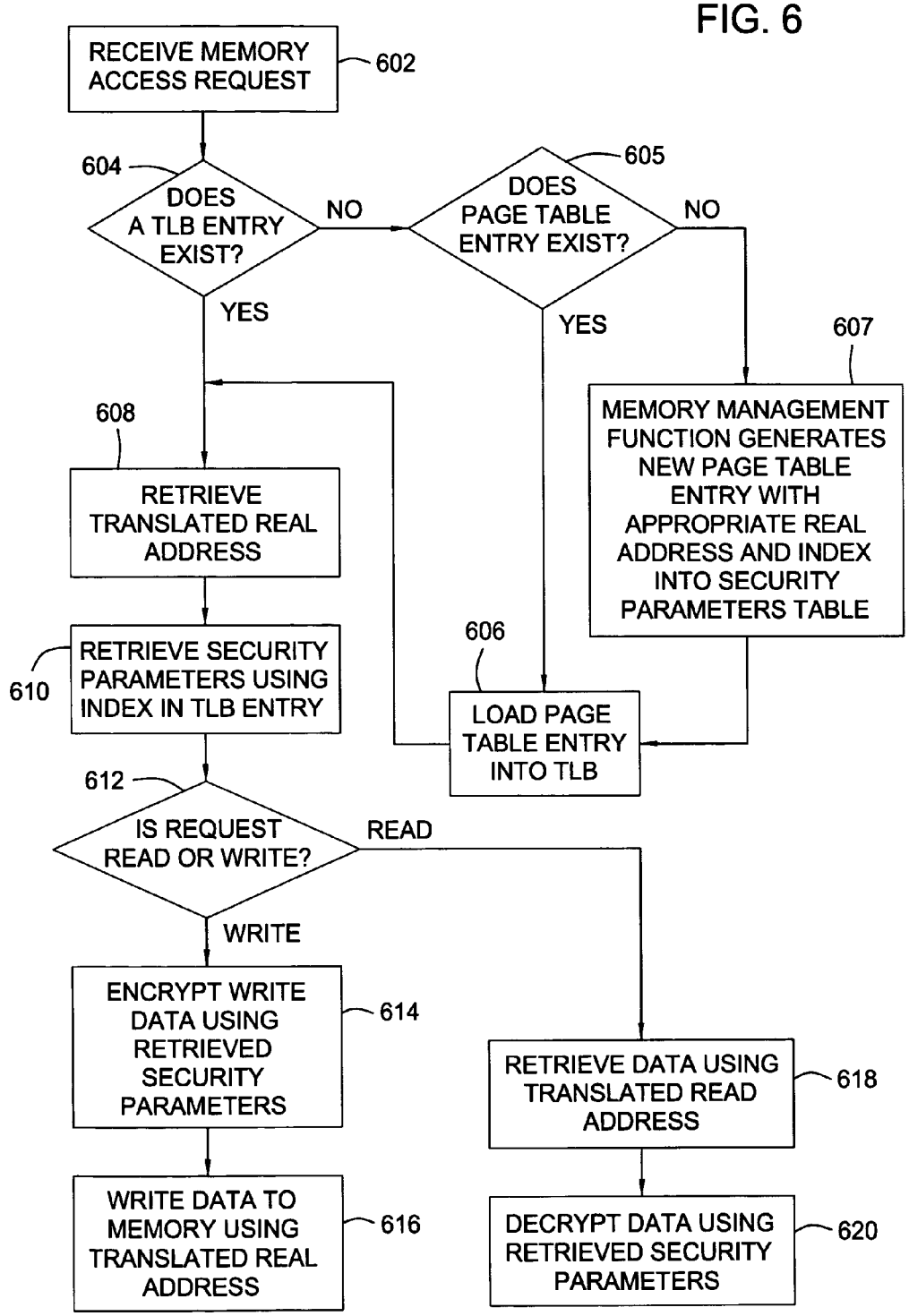
FIG. 6 is a flow diagram of exemplary operations for securely accessing data using security parameters retrieved utilizing an index stored in a TLB table, according to one embodiment of the present invention.

FIG. 6 is a flow diagram of exemplary operations for securely accessing data using security parameters retrieved utilizing an index stored in a TLB table. The operations 600 begin, at step 602, by receiving a memory access request. If a TLB entry exists for a memory location targeted by the request, as determined at step 604, a translated real address is retrieved from the TLB, at step 608.

If a TLB entry does not exist for the memory location targeted by the request, a system page table may be searched to determine if a corresponding page table exists, at step 605. If a corresponding page table does exist, the page table may be loaded into the TLB, at step 606. If a corresponding page table entry does not exist, one may first be generated by memory management software (or a hardware state machine), at step 607, with the page table entry containing an appropriate real address and index into the security parameters table 160. In other words, an index may be selected by memory management based on the security requirements of the subject virtual space (e.g., an index corresponding to a secure mode may be selected for a program being loaded). The new page table entry may then be loaded into the TLB by hardware or by software interrupt handlers.

At step 610, security parameters are retrieved using an index contained in the TLB entry. If the access request is a write operation, the security parameters are used to encrypt the write data (assuming a mode enabling encryption), at step 614, and the data is written to memory using the translated real address, at step 616. If the access request is a read operation, the requested data is read from memory using the translated real address and the data is decrypted (assuming a mode enabling decryption) using the retrieved security parameters.

CONCLUSION

By utilizing bits in a caching mechanism used to cache page table entries (e.g., a TLB) for storing an index used to retrieve a set of security parameters, the processing overhead conventionally involved in locating such parameters may be reduced. As a result, both the latency and number of hardware components required for secure data access may be reduced. Further, by utilizing a separate security parameters table, a relatively large amount of security information may be accessed with a relatively small index, which may afford a great amount of flexibility in implementing security functions.

While the foregoing is directed to embodiments of the present invention, other and further embodiments of the invention may be devised without departing from the basic scope thereof, and the scope thereof is determined by the claims that follow.

What is claimed is:

1. A method of securely accessing data, comprising:
   receiving a memory access request;
   retrieving a translated real address, from a first entry in a translation look aside buffer (TLB), for data targeted by the request;
   retrieving, from a security parameters table, security parameters using an index contained in the first entry in the TLB, wherein the security parameters contain information regarding how the targeted data should be encrypted, decrypted, or both; and
   accessing the targeted data using the retrieved translated real address and the security parameters.

2. The method of claim 1, further comprising:
   determining if the TLB entry exists; and
   if not, determining if a corresponding page table entry exists in a system page table and, if so, loading the corresponding page table entry into the TLB.

3. The method of claim 2, further comprising:
   if the corresponding page table entry does not exist, generating the corresponding page table entry with the index into the security parameters table.

4. The method of claim 1, wherein retrieving the security parameters using an index contained in the TLB entry, comprises:
   retrieving a key index from the security parameters table using the index contained in the TLB entry; and
   retrieving a set of key values from a key table using the key index.

5. The method of claim 1, wherein the memory request is a read request and accessing the targeted data using the retrieved translated real address and security parameters, comprises:
retrieving data, in an encrypted form, using the retrieved translated real address; and
decrypting the retrieved data using the retrieved security parameters.

6. The method of claim 1, wherein the memory request is a write request and accessing the targeted data using the retrieved translated real address and security parameters, comprises:
encrypting the targeted data using the retrieved security parameters; and
writing the encrypted data to external memory using the retrieved translated real address.

7. The method of claim 1, wherein the security parameters comprise an indication of a location of a stored integrity check value calculated for the targeted data and the method comprises:
retrieving the targeted data, in encrypted form, using the retrieved translated real address;
decrypting the targeted data using one or more of the retrieved security parameters;
calculating an integrity check value on the decrypted data; and
comparing the calculated integrity check value to the stored integrity check value.

8. The method of claim 1, wherein:
one or more index values are reserved to indicate a corresponding one or more security modes.

9. The method of claim 1, wherein at least one of the security parameters indicates a base address of internally stored metadata used to encrypt or decrypt targeted data.

10. The method of claim 1, wherein at least one of the security parameters indicates a base address of externally stored metadata used to encrypt or decrypt targeted data.

11. The method of claim 10, wherein the metadata comprises a security version value updated each time the targeted data is encrypted.

12. A security-enabled system on chip (SOC) for processing secure data stored, in an encrypted form in external memory, comprising:
one or more processing cores;
a security parameters table having entries, each containing a set of one or more security parameters for use in securely accessing a corresponding block of data;
a translation look aside buffer (TLB) having entries, wherein one or more of the entries contain a translated real address for a corresponding virtual address contained in a memory access request and an index value into the security parameters table; and
a security mechanism configured to securely access data targeted by memory access requests using the security parameters from the one or more entries in the security parameters table, the security parameters retrieved using the index value obtained from an entry in the TLB.

13. The SOC of claim 12, further comprising a security metadata cache for holding metadata used by the security mechanism for encryption.

14. The SOC of claim 13, wherein at least one of the security parameters is a base address of security metadata to be loaded in the security metadata cache.

15. The SOC of claim 14, wherein the security metadata comprises a usage counter modified each time a block of targeted data is encrypted.

16. The SOC of claim 12, wherein the security metadata comprises an offset location into a memory device internal to the SOC holding an integrity check value.

17. The SOC of claim 12, wherein:
the processor further comprises a key table; and
the security mechanism is configured to securely access the targeted data using a set of one or more keys retrieved from the key table using a key index included in the security parameters.

18. The SOC of claim 12, wherein the security parameters comprise an indication of a location of a stored integrity check value calculated for the targeted data and the security mechanism is configured to:
decrypting the targeted data using one or more of the retrieved security parameters;
calculating an integrity check value on the decrypted data; and
comparing the calculated integrity check value to the stored integrity check value.

19. A system, comprising:
external memory; and
a security-enabled system on chip (SOC) for processing secure data stored, in an encrypted form in the external memory, comprising:
a security parameters table having entries, each containing a set of one or more security parameters for use in securely accessing a corresponding block of data,
a translation look aside buffer (TLB) having entries, wherein one or more of the entries contain a translated real address for a corresponding virtual address contained in a memory access request and an index value into the security parameters table, and
a security mechanism configured to securely access data targeted by memory access requests using the security parameters from one or more entries in the security parameters table, the security parameters retrieved using the index value obtained from an entry in the TLB.

20. The system of claim 19, wherein:
the system further comprises a graphics processing unit; and
the processor is configured to access the external memory via a memory controller integrated with the graphics processing unit.

21. The system of claim 19, wherein the system is a gaming system and the security mechanism is configured to securely access a game program.

22. The system of claim 21, wherein at least one of the security parameters comprises a usage counter used to monitor the number of encryptions.

* * * * *